(12) United States Patent
Herdeg et al.

(10) Patent No.: US 6,541,143 B2
(45) Date of Patent: Apr. 1, 2003

(54) FUEL CELL SYSTEM WITH A DEVICE FOR SUPPLYING FUEL

(75) Inventors: Wolfgang Herdeg, Walddorfhäslach (DE); Holger Klos, München (DE); Martin Sattler, Königsberg (DE); Franz Reichenbach, Bad Vilbel (DE); Sabine Hess, Müchen (DE); Hans-Dieter Wilhelm, Darmstadt (DE); Jürgen Habrich, Hainburg (DE); Karl Eck, Frankfurt (DE); Thomas Zapp, Dortmund (DE)

(73) Assignee: Atecs Mannesmann AG, Düsseldorf (DE)

( * ) Notice: Subject to any disclaimer, the term of this patent is extended or adjusted under 35 U.S.C. 154(b) by 30 days.

(21) Appl. No.: 09/726,748

(22) Filed: Nov. 30, 2000

(65) Prior Publication Data

US 2001/0010874 A1 Aug. 2, 2001

(30) Foreign Application Priority Data

Nov. 30, 1999 (DE) .......................... 199 58 829

(51) Int. Cl.$^7$ .................... H01M 8/04; H01M 8/18
(52) U.S. Cl. .................... 429/19; 429/17; 429/34
(58) Field of Search .................... 429/17, 19, 12, 429/34

(56) References Cited

U.S. PATENT DOCUMENTS

| 4,806,079 | A | | 2/1989 | Kühn |
| 5,984,986 | A | * | 11/1999 | Wiesheu et al. .......... 429/17 X |
| 6,022,198 | A | | 2/2000 | Hoffmmeister |
| 6,103,411 | A | | 8/2000 | Matsubayashi et al. |
| 6,378,637 | B1 | * | 4/2002 | Ono et al. |
| 6,379,829 | B1 | * | 4/2002 | Kurita .......... 429/17 |
| 6,403,243 | B1 | * | 6/2002 | Herdeg et al. .......... 429/13 |

FOREIGN PATENT DOCUMENTS

| DE | 30 41 832 | 5/1982 |
| DE | 35 44 016 | 6/1987 |
| DE | 195 36 997 | 2/1997 |
| DE | 197 10 675 | 9/1998 |
| DE | 198 23 499 | 12/1998 |
| DE | 298 18 704 | 2/1999 |
| EP | 0 778 631 | 6/1997 |

\* cited by examiner

*Primary Examiner*—John S. Maples
(74) *Attorney, Agent, or Firm*—Cohen, Pontani, Lieberman & Pavane

(57) ABSTRACT

A fuel cell system which has a fuel cell is described. Also provided is a device for producing/preparing the fuel, for example hydrogen, which is connected on its outlet side to a fuel supply line and on its inlet side to a device for supplying fuel. The device for supplying fuel has a dual pump, in which a starting material for the fuel, stored in the motor-fuel tank, and water fed in via a water supply line, which is for example process water produced during the fuel cell process, are mixed to form a fuel/water mixture. This fuel/water mixture is intermediately stored in an intermediate tank before it is fed to the device for producing/preparing the fuel.

13 Claims, 2 Drawing Sheets

FUEL CELL SYSTEM WITH A DEVICE FOR SUPPLYING FUEL

BACKGROUND OF THE INVENTION

1. Field of the Invention

The present invention relates to a fuel cell system with a device for supplying fuel to the fuel cell.

2. Description of the Related Art

Fuel cells have long been known and have gained considerably in significance in recent years, especially in the area of the automobile industry.

In a fuel cell, current is produced by a chemical reaction. This involves converting a fuel and an oxidizing agent into electrical energy and water as reaction products. A fuel cell essentially comprises an anode part, a membrane and a cathode part. The membrane consists of a gas-impermeable and proton-conducting material and is arranged between the anode and the cathode in order to exchange ions. On the anode side, the fuel is fed in, while on the cathode side the oxidizing agent is fed in. At the anode, protons or hydrogen ions are generated by catalytic reactions and move through the membrane to the cathode. At the cathode, the hydrogen ions react with the oxygen and water is formed. The electrons given off during the reaction can be conducted as electric current through a load, for example the electric motor of an automobile.

Used for example as gaseous reactants for the fuel cell are hydrogen as the fuel and oxygen or air as the oxidizing agent.

If it is desired to operate the fuel cell with an energy source which is easily available or easily stored, such as natural gas, methanol or the like, these hydrocarbons must generally first be converted, initially into a hydrogen-rich gas, in a corresponding device for producing/preparing a fuel for a fuel cell, as is known for example from DE 198 23 499 A1. However, fuel cells which do not require such a prior conversion also already exist. For instance, EP 0 778 631 A1 discloses a fuel cell which is operated with a methanol/water mixture as the fuel.

The fuel or the starting material for the fuel is usually not introduced into the device for producing/preparing the fuel or the fuel cell in its pure form but as a motor-fuel/water mixture. For this reason, the motor fuel or the starting material for the fuel must initially be mixed with a suitable amount of water.

For the delivery of liquid media, so-called dual pumps, which respectively comprise two separate pumps within a common housing and are usually operated by means of a common drive, have been used for many years. For instance, DE 298 18 704 U1 discloses a dual pump which is used for example for the delivery of two different cooling flows in a cooling system. DE 197 10 675 A1 discloses a dual pump which is intended in particular for the delivery of heating water and comprises two pumps which are designed for delivery flows of distinctly different magnitudes and the rotational speeds of which are regulated individually or jointly, according to choice, by a pump control system and are operated over a great range of the total delivery rate. Furthermore, DE 195 36 997 C1 discloses a dual pump of an axial-piston type of design, which provides a joint suction line for both pumps, in which line a centrifugal pump is arranged for creating a suitable admission pressure for the two pumps of the dual pump. Furthermore, DE 30 41 832 A1 discloses an axial-piston dual pump for high-performance hydraulics. Finally, DE 35 44 016 C2 is concerned with a pump arrangement designed as a dual pump for the metered dispensing of at least 2 components with an adjustable mixing ratio. For this purpose, the two pumps of the dual pump are respectively provided with a swept-volume adjusting device, the two adjusting devices being connected to each other for joint symmetrical adjustment.

SUMMARY OF THE INVENTION

The present invention is based on the object of improving a fuel cell system of the generic type to the extent that a required motor-fuel/water mixture can be prepared and introduced into the device for producing/preparing the fuel or directly into the fuel cell in as simple and low-cost a way as possible.

This object is achieved according to the invention by a fuel cell system with a fuel cell which has an anode part with a supply line and a discharge line for a fuel and a cathode part with a supply line and a discharge line for an oxidizing agent, and with a device for supplying the fuel to the fuel cell either directly or via a device for producing/preparing the fuel, which is connected on the outlet side to the fuel supply line and on the inlet side to the device for supplying fuel, wherein the device for supplying fuel has a motor-fuel tank from which a motor-fuel supply line is led out. Also provided is a dual pump, which is likewise arranged in the motor-fuel supply line and is also connected to a water supply line. Finally, an intermediate tank is provided for the intermediate storage of the motor-fuel/water mixture and is likewise arranged in the motor-fuel line, downstream of the dual pump in the direction of flow.

The device according to the invention makes it possible in a simple and low-cost way to prepare a required motor-fuel/water mixture and to make it available to the device for producing/preparing the fuel or directly to the fuel cell.

In this case, the starting material for the fuel of the fuel cell is initially stored as motor fuel in the motor-fuel tank. If hydrogen is used as fuel for the fuel cell, the motor fuel may be, for example, methanol, methane, gasoline, natural gas, coal gas, biogas or the like.

The motor fuel is fed into the dual pump via the motor-fuel supply line. The dual pump is also connected to a corresponding water supply line. Such a dual pump has the effect that the motor fuel pumped out of the motor-fuel tank, serving as the starting material for the fuel, is mixed with the water, initially to form a motor-fuel/water mixture, before entering the device for producing/preparing the fuel or into the fuel cell.

This mixture produced in the dual pump is then intermediately stored in an intermediate tank, before it is fed into the device for producing/preparing the fuel or into the fuel cell.

The intermediate tank serves as a buffer store, so that a sufficient amount of motor-fuel/water mixture is always available for operating the device for producing/preparing the fuel or for operating the fuel cell. The presence of a sufficient amount of motor-fuel/water mixture is of significance in particular in the starting phase or running-up phase of the fuel cell system. During the starting phase of the fuel cell system—especially during cold starting—it is necessary to introduce the motor-fuel/water mixture as quickly as possible into the device for producing/preparing the fuel or into the fuel cell, in order that the fuel cell reaches its optimum performance capability as quickly as possible. The use of an intermediate tank in the motor-fuel supply line achieves the effect that a sufficient amount of motor-fuel/water mixture always remains in the fuel cell system— especially also after switching off the fuel cell—, so that when the fuel cell system is started again the motor-fuel/water mixture does not first have to be produced but is available right away.

Water which is discharged from the fuel cell during the fuel cell process and is recovered from the exhaust-gas flows from the fuel cell is advantageously used for the dual pump. This solution is explained in more detail in the further course of the description, without intending to restrict the invention to this one solution. The water supplied to the dual pump via the water supply line may, however, also be supplied from an external water source.

The device according to the invention for supplying fuel makes it possible in a simple way to prepare a motor fuel before it is further used as an intermediate product by mixing in process water right at the beginning of the process sequence in order to produce the corresponding motor-fuel/water mixture.

A further pump may advantageously be provided in the motor-fuel supply line upstream of the dual pump in the direction of flow of the motor fuel. By means of this pump, which is designed for example as a motor-fuel pump, the motor fuel or the starting material for the fuel is pumped out of the motor-fuel tank and passed into the dual pump. With a correspondingly powerful dual pump, this function can also be assumed by the dual pump.

During the starting phase of the fuel cell system, the dual pump and/or the further pump is advantageously operated by means of an electrical power source that is independent of the fuel cell, preferably a chargeable battery.

The intermediate tank may preferably be arranged in or on the motor-fuel tank. In this way, a very space-saving type of design can be accomplished, which is of advantage in particular when the device is used in a motor vehicle, since usually only a very limited installation space is available there.

In a further development, a water tank may be provided in the water supply line.

Such a water tank is of advantage for example when water which is discharged from the fuel cell during the fuel cell process and recovered from the exhaust-gas flows of the fuel cell is used for producing the motor-fuel/water mixture. This process water is passed via the water supply line into the dual pump, where it is mixed with the starting material for the fuel.

Such process water is only produced, however, during the operation of the fuel cell, with the result that in the starting phase of the fuel cell system in particular it is not yet available. For this reason, the water tank serves as a corresponding water reservoir, from which water can be taken, in particular during the starting phase of the fuel cell system, to allow the required motor-fuel/water mixture to be made available as quickly as possible.

However, it may also be appropriate to dispense with such a water tank and accomplish the feeding of water into the dual pump by appropriate dimensioning of the water supply line alone. In particular whenever the device for supplying fuel into a fuel cell is used in conditions where there are very low ambient temperatures, that is to say temperatures below freezing, there is the risk that water located in a water tank may freeze. In such a case, the frozen water would first have to be thawed, which is relatively time-consuming. If a fuel cell system provided with such a device for supplying fuel is used at very low temperatures, whenever possible a separate water tank should therefore not be used.

To allow an adequate amount of motor-fuel/water mixture nevertheless to be made available already during the starting phase of a fuel cell system in such a case, the water tank must be dimensioned such that it can take enough motor-fuel/water mixture for the fuel cell system to be operated with the stored amount until sufficient process water for further operation is produced by the fuel cell process.

If a water tank is nevertheless used in the water supply line, the problem of possible freezing of water located in the water tank can be countered, for example, by the water tank always being emptied when stationary and the water tank only being filled during operation of the fuel cell system. This means that, in particular in the time periods after switching off the fuel cell system and also during the starting phase of the fuel cell system, the water tank is empty. As a result, freezing of water in the water tank can no longer occur. In another development of the invention, it is conceivable to design the water tank in the form of an expandable vessel. Should water located in the water tank freeze and expand as a result, damage to the water tank can be prevented by its ability to expand.

The water supply line and/or the water tank is preferably connected to a drain valve. The process water can be drained off via the drain valve, for instance when the intermediate tank is full. Furthermore, to avoid freezing, it is possible for water to be drained from the water supply line and/or the water tank if the fuel cell system is switched off for a relatively long time or when there are low temperatures.

In a further development, a further pump may be provided downstream of the intermediate tank in the direction of flow. It is ensured by means of this pump that the motor-fuel/water mixture is introduced at a required pressure into the device for producing/preparing the fuel or the fuel cell. It is conceivable, for example, to use such a pump whenever the motor-fuel/water mixture only has a pressure of $\leq 1$ bar when it leaves the intermediate tank. If, on the other hand, the pressure after the intermediate tank is, for example, already 1 bar or more, such a pump is generally not required. In this case, the pump can in fact remain switched off and only has to be activated in emergencies. For this purpose, a bypass line bypassing the pump may be provided, sending the motor-fuel/water mixture past the pump if the pressure is sufficiently high. If the pressure drops below a certain limit value, the mixture can then be passed via the pump by adjusting a corresponding valve.

In a fuel cell system according to the invention, it is possible in a simple and low-cost way to make an adequate amount of motor-fuel/water mixture always available to a device for producing/preparing the fuel.

In the device for supplying fuel, the motor-fuel/water mixture is initially prepared in the required mixing ratio. Subsequently, this motor-fuel/water mixture is introduced into the device for producing/preparing the fuel, where it is converted into a hydrogen-rich gas. Then, this hydrogen-rich gas is introduced into the fuel cell via the fuel supply line.

The device for producing/preparing the fuel usually has a number of reactor elements, which are connected to one another via corresponding lines, so that the fuel flows through the individual reactor elements while it is being produced or prepared.

Heat is required in some of the reactor elements. One of these reactor elements is, for example, an evaporator. Such an evaporator is required for instance whenever hydrogen is to be re-formed from methanol or the like. Another reactor element is a reformer, which is arranged downstream of the evaporator and in which the motor-fuel/water mixture is re-formed into a hydrogen-rich gas.

In other reactor elements, on the other hand, heat is released. These reactor elements may be designed, for example, as selective oxidation elements. This reactor element is required if the hydrogen is produced by the process of partial oxidation. In this case, the gas is initially cleaned in a shift reactor for the removal of CO by a homogeneous water-gas reaction and is finely cleaned in the following stage—that of selective oxidation.

A water separator, which is connected in particular to the water supply line of the dual pump, may preferably be provided in the fuel discharge line and/or the oxidizing-agent discharge line of the fuel cell. This water separator allows the process water produced during the fuel cell process to be collected and subsequently put to further use. This is because not only heat but also water is produced, inter alia, during the operation of the fuel cell, and is carried away in the form of water vapor in the exhaust-gas flow of the oxidizing agent and/or of the fuel. To transform the water vapor into the liquid state, in order that it is available for other processes, for example the mixing in of the process water at the beginning of the process sequence, after leaving the fuel cell the gas flow containing the water vapor flows through the water separator, in which the water vapor is condensed into liquid water.

This water is preferably passed via the water supply line to the dual pump and used there for producing the motor-fuel/water mixture.

A fuel cell system according to the invention, as described above, can preferably be used in a vehicle or for a vehicle, in particular as a power source for an electric vehicle. On account of the rapid development of fuel cell technology in the automobile sector, such a use offers particularly good application possibilities. Nevertheless, other application possibilities are also conceivable. To be mentioned here are, inter alia, fuel cells for mobile devices such as computers or the like through to stationary facilities such as power plants. Here, the fuel cell technology is particularly suited for the decentralized supplying of energy to houses, industrial plants or the like.

In a preferred way, the present invention is used in conjunction with fuel cells with a polymer membrane (PEM). These fuel cells have a high electrical efficiency, cause only minimal emissions, have optimum part-load characteristics and are essentially free from mechanical wear.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
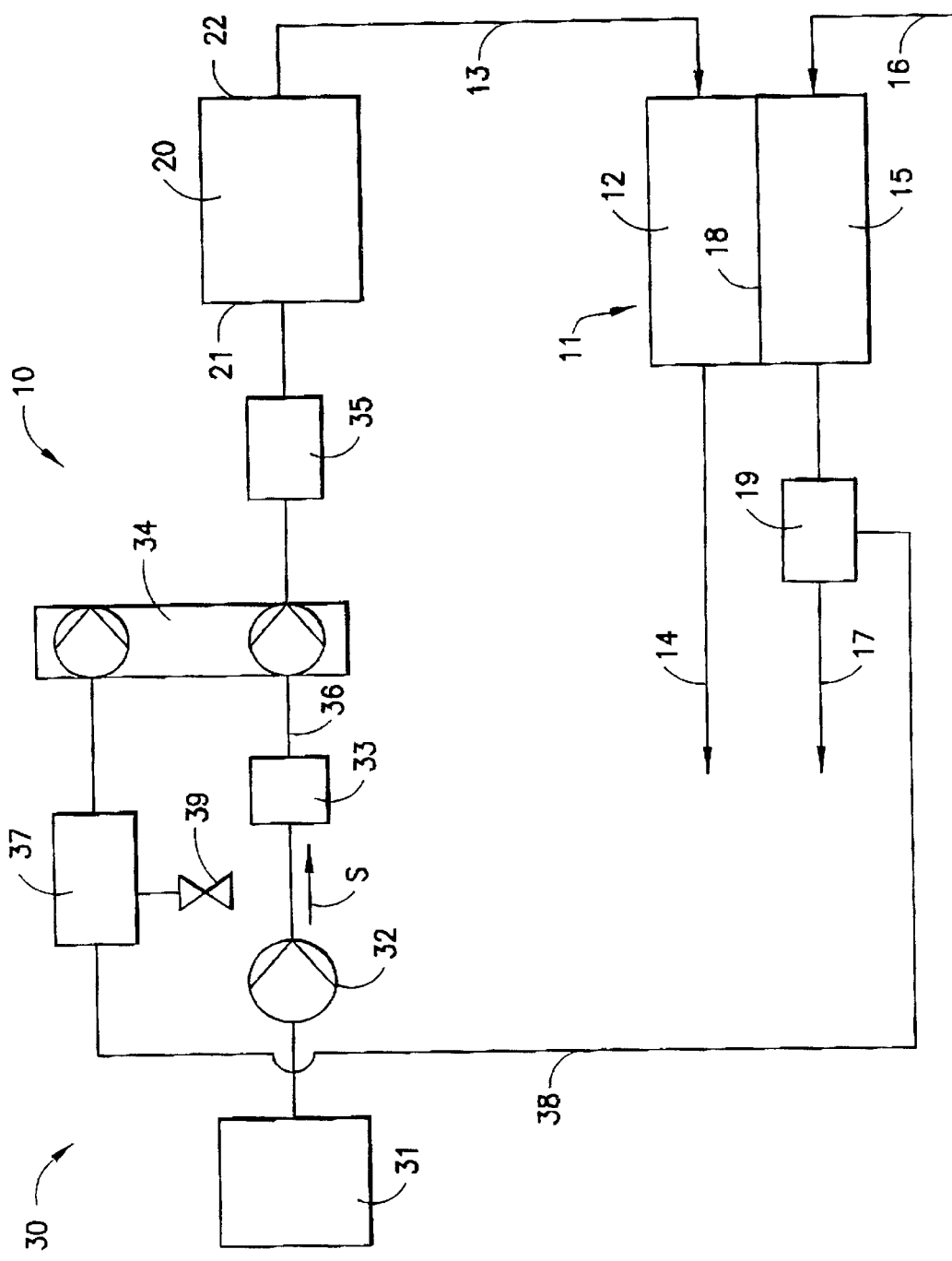
FIG. 1 shows in a schematic representation a fuel cell system according to the invention, with a device for supplying fuel.

Represented in FIG. 1 is a fuel cell system 10 which is used for operating an electric drive in a vehicle.

The fuel cell system 10 has a fuel cell 11, with an anode part 12, a cathode part 15 and a membrane 18. The anode part 12 is connected to a cell fuel supply line 13 and a fuel discharge line 14. In the depicted embodiment the fuel is hydrogen. The cathode part 15 is connected to a supply line 16 and a discharge line 17 for an oxidizing agent, in the present case the agent being oxygen or air.

Also provided is a device 20 for producing/preparing the fuel to be fed to the fuel cell 11, which device has a number of reactor elements and is connected on its outlet side 22 to the fuel supply line 13. On its inlet side 21, the device 20 is connected to a device 30 for supplying fuel.

As FIG. 1 shows, the device 30 for supplying fuel firstly has a motor-fuel tank 31, in which there is stored a motor fuel, which forms the starting material for the cell fuel, the motor fuel for example being methanol, gasoline, natural gas or the like. The motor-fuel tank 31 is connected via a motor-fuel supply line 36 to the inlet side 21 of the device 20 for producing/preparing the fuel.

In the motor-fuel supply line 36 there is provided firstly a motor-fuel pump 32, by means of which the motor fuel is pumped out of the motor-fuel tank 31. The motor fuel is pumped in the direction of flow S through a motor-fuel filter 33 into a first inlet section of a dual pump 34. A second inlet section of dual pump 34 is connected to a water supply line 38, in which a water tank 37 provided with a drain valve 39 is arranged. The water supply line 38 is additionally connected to a water separator 19, which is arranged in the oxidizing-agent discharge line 17.

In the dual pump 34, a motor-fuel/water mixture required for the device 20 for producing/preparing the fuel is prepared by a corresponding mixture of motor fuel from the motor-fuel tank 31 and water from the water tank 37. This motor-fuel/water mixture is supplied by dual pump 34 to and intermediately stored in an intermediate tank 35, before it is made available to the device 20 for producing/preparing the fuel.

The intermediate storage tank, as can others of components such as the duel pump 34, can be mounted directly on the motor fuel tank. Such practice would be in furtherance of minimizing overall system space taking where component mounting space is at a premium in a motor vehicle.

The mode of operation of the fuel cell system 10 is now described. During the normal operation of the fuel cell 11, electric current is produced in the latter and, as a byproduct, heat and water are produced in the form of water vapor. The water vapor is discharged from the fuel cell 11, for example via the oxidizing-agent discharge line 17. To recover the water, the water separator 19, in which the water vapor condenses to form liquid water, is provided in the oxidizing-agent discharge line 17. The liquid water is pumped via the water supply line 38 to the dual pump 34. In the present exemplary embodiment, a water tank 37, in which process water is produced during the fuel cell process and is intermediately stored, is additionally provided in the water supply line 38. This process water is mixed in the dual pump 34 together with motor fuel, taken from the motor-fuel tank 31, to form a motor-fuel/water mixture, which is subsequently intermediately stored in the intermediate tank 35. From there, the motor-fuel/water mixture is introduced into the device 20 for producing/preparing the fuel, where it is re-formed into a hydrogen-rich gas for the operation of the fuel cell 11.

In particular when the fuel cell system 10 is used in conditions where there are low temperatures, that is to say at temperatures below freezing, use of a water tank 37 may lead to the water stored in the water tank 37 freezing after the fuel cell system 10 has been switched off. To avoid such freezing, it is also possible to dispense with the water tank 37. In this case, the water supply line 38 and the intermediate tank 35 must be dimensioned large enough for sufficient water or a sufficiently large amount of fuel/water mixture always to be available during normal operation for forming the fuel/water mixture. If there is a risk of frost, it must be ensured in this case as well that the water supply line 38 is emptied in time. To avoid these difficulties, it is also possible, however, to use only a small water tank 37 or a water tank designed as an expansion vessel, which is arranged for example in the vicinity of elements producing considerable amounts of heat. To avoid process water freezing in the water supply line 38 and/or in the water tank 37 while the fuel cell system 10 is switched off, the drain valve 39 is provided, allowing the process water located in the water supply line 38 and/or the water tank 37 to be discharged. This drain valve 39 may also be actuated in a controlled manner when the intermediate tank 35 has been filled and the process water produced continuously during the fuel cell process is not required at the present time.

The intermediate tank 35 has the purpose of allowing sufficient motor-fuel/water mixture always to be made available—especially during the starting phase of the fuel cell system 10—for the device 20 for producing/preparing the fuel. The motor-fuel/water mixture also remains in the intermediate tank 35 when the fuel cell system 10 is switched off. On account of the mixing in of fuel with the water, with the effect of lowering the freezing point, the liquid stored in the intermediate tank 35 can be prevented from freezing at temperatures below the freezing point. When the fuel cell system 10 is started, motor-fuel/water mixture can be introduced into the device 20 without delay from the intermediate tank 35, which has the function of a buffer store, so that the time period up to when fuel is ready for the fuel cell can be kept as short as possible.

Figure 2:
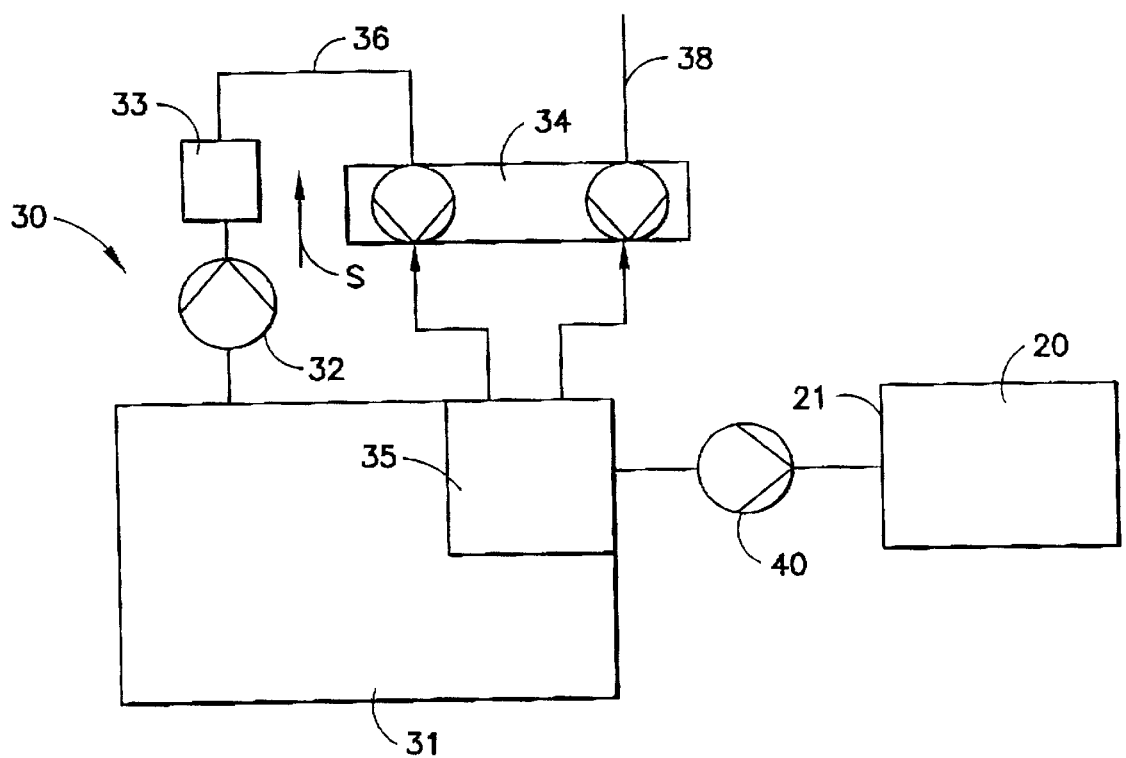
FIG. 2 shows a further embodiment of a device for supplying fuel.

Represented in FIG. 2 is a further embodiment of the device 30 for supplying fuel, identical components being provided with identical reference numerals.

In the exemplary embodiment according to FIG. 2, the intermediate tank 35 is integrated into the motor-fuel tank 31. This leads to a reduction in the required installation space. The motor fuel is pumped out of the motor-fuel tank 31 by means of the motor-fuel pump 32 and introduced in the direction of flow S via the fuel filter 33 into the dual pump 34, where it is mixed together with process water, which is fed in via the water supply line 38, to form a motor-fuel/water mixture. This motor-fuel/water mixture is fed into the intermediate tank 35. The motor-fuel pump 32 may also be arranged, for example, in the motor-fuel tank 31. The fuel filter 33 may also be arranged, for example, downstream of the pump 40 in the direction of flow, which pump produces the required pressure for passing on the motor-fuel/water mixture from the intermediate tank 35 into the device 20 for producing/preparing the fuel.

If no water tank 37 such as that represented in FIG. 1 is used in the water supply line 38, the water supply line 38 and the intermediate tank 35 must be dimensioned such that a sufficient amount of fuel/water mixture can be produced and intermediately stored during the operating process of the fuel cell 11. The amount of intermediately stored fuel/water mixture must be large enough to allow the fuel cell system 10 to be supplied via this intermediately stored fuel/water mixture alone during its starting phase. Later, once the fuel cell system 10 has reached its optimum performance capability, the intermediate tank 35 can be filled once again with fuel/water mixture.

If an inlet pressure of the fuel/water mixture of over 1 bar is required for example in the device 20 for producing/preparing the fuel, the pump 40 can be activated whenever the fuel/water mixture leaving the intermediate tank 35 has a pressure of $\leq 1$ bar. In this way, it is ensured that the fuel/water mixture is always made available at a constant pressure to the device 20 for producing/preparing the fuel.

Figure 3:
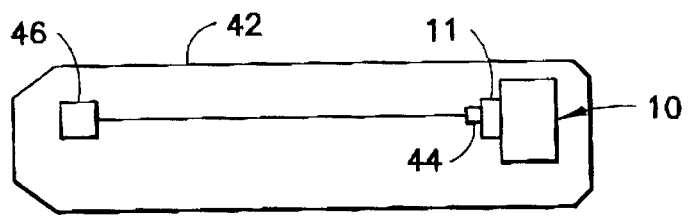
FIG. 3 is a schematic depiction of the connection of the fuel cell system with a vehicle electric system for providing electric power to the vehicle.

Referring to FIG. 3, the fuel cell system 10 can be embodied in a vehicle 42 for employing the fuel cell 11 of the system to supply electric power to the vehicle. In this arrangement, the fuel cell has an electric power outlet 44 which is connected to the vehicle electric system 46 for supply of electric power thereto.

The invention is not limited by the embodiments described above which are presented as examples only but can be modified in various ways within the scope of protection defined by the appended patent claims.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A fuel cell system comprising:

a fuel cell having an anode part and a cathode part;

a device for producing/preparing cell fuel, said device having an outlet and an inlet;

a cell fuel supply line connecting said producing/preparing device outlet with said anode part;

an oxidizing agent supply line connected to the cathode part of said fuel cell;

an intermediate storage tank;

a motor-fuel tank for holding motor fuel;

a water supply line; and a dual pump unit having a first inlet section and a second inlet section, said first inlet section communicating with an outlet of said motor fuel tank, said second inlet section communicating with said water supply line, said dual pump unit discharging a motor-fuel/water mixture to said intermediate storage tank, the motor-fuel/water mixture in said intermediate storage tank being supplied from said intermediate storage tank to the inlet of said producing/preparing device for reforming of said motor-fuel/water mixture in said producing/preparing device into a hydrogen-rich cell fuel gas, the hydrogen-rich cell gas outletting from the producing/preparing device into said cell fuel supply line.

2. A fuel cell system as claimed in claim 1, further comprising a water tank, said water supply line being connected to said water tank.

3. A fuel cell system as claimed in claim 2, further comprising:
   a water separator; and
   a discharge line connecting at least one of said anode part and said cathode part to said water separator for supplying fuel cell operation produced water vapor to said water separator, said water separator condensing said water vapor into water.

4. A fuel cell system as claimed in claim 3, further comprising a recirculating line connected to said water separator water tank for recirculating water from said water separator to at least one of said water supply line and said water tank.

5. A fuel cell system as claimed in claim 4, further comprising a drain valve connected to at least one of said water line and said water tank.

6. A fuel cell system as claimed in claim 2, further comprising a fuel discharge line connected to said anode part.

7. A fuel cell system as claimed in claim 2, comprising an oxidizing agent discharge line connected to said cathode part.

8. A fuel cell system as claimed in claim 1, wherein said dual pump unit is communicated with said motor-fuel tank with a motor fuel supply line, and further comprising a motor-fuel pump disposed in said motor-fuel supply line upstream of said dual pump unit.

9. A fuel cell system as claimed in claim 8, further comprising a motor-fuel filter disposed in said motor-fuel supply line intermediate said motor-fuel pump and said dual pump unit.

10. A fuel cell system as claimed in claim 1, further comprising an additional pump disposed at a location between said intermediate storage tank and said producing/preparing device for pressurizing motor-fuel water mixture flow from said intermediate storage tank to said producing/preparing device.

11. A fuel cell system as claimed in claim 1, wherein said intermediate storage tank is mounted on said motor-fuel tank.

12. A fuel cell system as claimed in claim 1, wherein said intermediate storage tank is mounted in the motor-fuel tank.

13. A fuel cell system as claimed in claim 1, wherein said system is embodied in a vehicle, said fuel cell having an electric power outlet, said vehicle having an electric system, said fuel electric power outlet being connected to said electric system.

* * * * *